US010121259B2

(12) United States Patent
Geiger

(10) Patent No.: US 10,121,259 B2
(45) Date of Patent: Nov. 6, 2018

(54) SYSTEM AND METHOD FOR DETERMINING MOTION AND STRUCTURE FROM OPTICAL FLOW

(71) Applicant: New York University Langone Medical Center, New York, NY (US)

(72) Inventor: Davi Geiger, New York, NY (US)

(73) Assignee: New York University Langone Medical, New York, NY (US)

( * ) Notice: Subject to any disclaimer, the term of this patent is extended or adjusted under 35 U.S.C. 154(b) by 298 days.

(21) Appl. No.: 15/174,980

(22) Filed: Jun. 6, 2016

(65) Prior Publication Data
US 2017/0024900 A1 Jan. 26, 2017

Related U.S. Application Data

(60) Provisional application No. 62/170,915, filed on Jun. 4, 2015.

(51) Int. Cl.
*G06T 7/20* (2017.01)
*G06T 7/579* (2017.01)
*G06T 7/50* (2017.01)

(52) U.S. Cl.
CPC .... *G06T 7/579* (2017.01); *G06T 2207/10016* (2013.01)

(58) Field of Classification Search
CPC ... G06T 2207/10028; G06T 7/20; G06T 7/50; G06T 7/55; G06T 7/57
See application file for complete search history.

(56) References Cited

U.S. PATENT DOCUMENTS

| | | | | |
|---|---|---|---|---|
| 8,149,268 B1* | 4/2012 | Meyers | .................. | H04N 5/144 348/42 |
| 8,564,657 B2* | 10/2013 | Michalke | ................ | G06T 7/251 348/116 |
| 9,307,220 B2* | 4/2016 | Wu | ..................... | H04N 13/0022 |
| 2005/0058337 A1* | 3/2005 | Fujimura | ........... | G06K 9/00201 382/159 |
| 2006/0020562 A1* | 1/2006 | Murali | .................... | G06T 7/579 706/12 |
| 2008/0089556 A1* | 4/2008 | Salgian | .................. | G06K 9/209 382/103 |
| 2013/0286017 A1* | 10/2013 | Marimon Sanjuan | ....................... | G06T 15/00 345/427 |
| 2013/0321790 A1* | 12/2013 | Kirby | ................. | H04N 13/0239 356/3.14 |
| 2015/0154447 A1* | 6/2015 | Wilson | ............... | G06K 9/00624 382/103 |

(Continued)

*Primary Examiner* — Wesley J Tucker
(74) *Attorney, Agent, or Firm* — Meister Seelig & Fein LLP

(57) ABSTRACT

A method and system for extracting motion and structure from a sequence of images stored on a computer system, the method comprises obtaining images including a set of three-dimensional (3D) points over a plurality of frames, determining an instantaneous motion of the set of 3D points by an angular velocity and a translation with respect to an axis of rotation, computing an optical flow using the instantaneous motion of the set of 3D points based on a projection of velocity of the set of 3D points, computing a depth of the set of 3D points from the optical flow, and determining an epipolar line in the images using the optical flow.

20 Claims, 2 Drawing Sheets a. Left: image of recovery 1/Z(x)   b. Right: one image frame.

c. Left: image of recovery 1/Z(x)   d. Right: one image frame.

(56) References Cited

U.S. PATENT DOCUMENTS

| | | | | |
|---|---|---|---|---|
| 2015/0242700 | A1* | 8/2015 | Zhang | G06K 9/4604 |
| | | | | 382/154 |
| 2017/0182406 | A1* | 6/2017 | Castiglia | A63F 13/213 |
| 2017/0330031 | A1* | 11/2017 | Wilson | G06T 7/248 |
| 2018/0115706 | A1* | 4/2018 | Kang | H04N 5/23238 |

* cited by examiner

SYSTEM AND METHOD FOR DETERMINING MOTION AND STRUCTURE FROM OPTICAL FLOW

CROSS REFERENCE TO RELATED APPLICATION

This application claims the priority of U.S. Provisional Application No. 62/170,915, entitled "SYSTEM AND METHOD FOR DETERMINING MOTION AND STRUCTURE FROM OPTICAL FLOW," filed on Jun. 4, 2015, the disclosure of which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

The invention described herein generally relates to determining motion and structure from optical flow, in particular, computing structure-from-motion.

Description of the Related Art

The simultaneous recovery of three-dimensional (3D) shape and motion from image sequences is one of the more difficult problems in computer vision. Classical approaches to the problem rely on using algebraic techniques to solve for these unknowns given two or more images. Image movement for humans provides one of the most useful cues for depth. For example, the shadow of a contorted wire appears flat when the wire is stationary, but rotating the wire causes motion in the shadow, which then appears three-dimensional. The computational mechanism of this effect, known as "structure-from-motion," is determined according to embodiments of the present invention.

SUMMARY OF THE INVENTION

The present invention provides a method and system for extracting motion and structure from a sequence of images stored on a computer system. The method comprises obtaining images including a set of three-dimensional (3D) points over a plurality of frames, determining an instantaneous motion of the set of 3D points by an angular velocity and a translation with respect to an axis of rotation, computing an optical flow using the instantaneous motion of the set of 3D points based on a projection of velocity of the set of 3D points, computing a depth of the set of 3D points from the optical flow, and determining an epipolar line in the images using the optical flow.

Obtaining the images may include retrieving the images from a memory device of the computer system. The depth and the epipolar line in the images may be used by a computer processor to analyze distances of object surfaces within the images. The computer system may be any system used for robotic vision, self-driving vehicles, image coding, and 3D modeling.

Determining the instantaneous motion of the set of 3D points may include calculating $V(P) = w \times P + T$, where $V(P)$ is the instantaneous motion of a given point, $w$ is the angular velocity, $P$ is the given point, and $T$ is a translation of the given point. In one embodiment, computing the optical flow comprises computing displacement of 3D velocity for the set of 3D points over the plurality of frames. According to another embodiment, computing the optical flow comprises calculating $$v(x) = \begin{bmatrix} v_x(x) \\ v_x(x) \\ 0 \end{bmatrix} = \begin{bmatrix} \frac{dx}{dt} \\ \frac{dy}{dt} \\ 0 \end{bmatrix} = \begin{bmatrix} \frac{d(X/Z)}{dt} \\ \frac{d(Y/Z)}{dt} \\ 0 \end{bmatrix} = \frac{1}{Z^2}\begin{bmatrix} ZV_x - XV_z \\ ZV_y - YV_z \\ 0 \end{bmatrix} = \frac{1}{Z(x)}(x \times V) \times \hat{Z},$$

where $v(x)$ is an optical flow of a x coordinate point for a 3D plane including X, Y, Z coordinates, and V is an instantaneous motion for a given coordinate of a 3D point. Computing the depth may include calculating depth given the angular velocity, translation, and optical flow. In a certain embodiment, determining the epipolar line may include calculating $$0 = l_x \cdot x^t = x \begin{bmatrix} 0 & -T_z & T_y \\ T_z & 0 & -T_x \\ -T_y & T_x & 0 \end{bmatrix} x^t,$$

where $l_x = -t(x \times T) + t^2(w^t Q T)\hat{Z}$, $$Q = [x]^2 = \begin{bmatrix} -(1+y^2) & xy & x \\ xy & -(1+x^2) & y \\ x & y & -(x^2+y^2) \end{bmatrix},$$

t is a given time, w is the angular velocity, and T is a translation of a given coordinate.

The system comprises a processor; and a memory having executable instructions stored thereon that when executed by the processor cause the processor to obtain images including a set of three-dimensional (3D) points over a plurality of frames, determine an instantaneous motion of the set of 3D points by an angular velocity and a translation with respect to an axis of rotation, compute an optical flow using the instantaneous motion of the set of 3D points based on a projection of velocity of the set of 3D points, compute a depth of the set of 3D points from the optical flow, and determine an epipolar line in the images using the optical flow.

The processor can be utilized to analyze distances of object surfaces within the images based on the depth and the epipolar line in the images. The processor determining the instantaneous motion of the set of 3D points may include the processor calculating $V(P) = w \times P + T$, where $V(P)$ is the instantaneous motion of a given point, $w$ is the angular velocity, $P$ is the given point, and $T$ is a translation of the given point. In one embodiment, the processor computing the optical flow comprises the processor computing displacement of 3D velocity for the set of 3D points over the plurality of frames. According to another embodiment, the processor computing the optical flow comprises the processor calculating $$v(x) = \begin{bmatrix} v_x(x) \\ v_x(x) \\ 0 \end{bmatrix} = \begin{bmatrix} \frac{dx}{dt} \\ \frac{dy}{dt} \\ 0 \end{bmatrix} = \begin{bmatrix} \frac{d(X/Z)}{dt} \\ \frac{d(Y/Z)}{dt} \\ 0 \end{bmatrix} = \frac{1}{Z^2}\begin{bmatrix} ZV_x - XV_z \\ ZV_y - YV_z \\ 0 \end{bmatrix} = \frac{1}{Z(x)}(x \times V) \times \hat{Z},$$

where v(x) is an optical flow of a x coordinate point for a 3D plane including X, Y, Z coordinates, and V is an instantaneous motion for a given coordinate of a 3D point.

The processor computing the depth may include the processor calculating depth given the angular velocity, translation, and optical flow. In a certain embodiment, the processor determining the epipolar line includes the processor calculating $$0 = l_x \cdot x^t = x \begin{bmatrix} 0 & -T_z & T_y \\ T_z & 0 & -T_x \\ -T_y & T_x & 0 \end{bmatrix} x^t,$$

where $l_x = -t(x \times T) + t^2(w^t QT)\hat{Z}$, $$Q = [x]^2 = \begin{bmatrix} -(1+y^2) & xy & x \\ xy & -(1+x^2) & y \\ x & y & -(x^2+y^2) \end{bmatrix},$$

t is a given time, w is the angular velocity, and T is a translation of a given coordinate. The depth of the set of 3D points and the epipolar line in the images can be utilized in any one of systems for robotic vision, self-driving vehicles, image coding, and 3D modeling.

According to another embodiment, non-transitory computer readable medium comprising program code that when executed by a programmable processor causes execution of a method for extracting motion and structure from a sequence of images stored on a computer system. The computer readable medium comprising computer program code for obtaining images including a set of three-dimensional (3D) points over a plurality of frames, computer program code for determining an instantaneous motion of the set of 3D points by an angular velocity and a translation with respect to an axis of rotation, computer program code for computing an optical flow using the instantaneous motion of the set of 3D points based on a projection of velocity of the set of 3D points, computer program code for computing a depth of the set of 3D points from the optical flow, and computer program code for determining an epipolar line in the images using the optical flow.

The computer program code for obtaining the images may include computer program code for retrieving the images from a memory device of the computer system. The computer readable medium may further include computer program code for analyzing, by a processor of the computer system, distances of object surfaces within the images based on the depth and the epipolar line in the images. The computer system may be any system used for robotic vision, self-driving vehicles, image coding, and 3D modeling.

The computer program code for determining the instantaneous motion of the set of 3D points may further include computer program code for calculating V(P)=w×P+T, where V(P) is the instantaneous motion of a given point, w is the angular velocity, P is the given point, and T is a translation of the given point. In one embodiment, the computer program code for computing the optical flow further includes computer program code for computing displacement of 3D velocity for the set of 3D points over the plurality of frames. According to another embodiment the computer program code for computing the optical flow further includes computer program code for calculating $$v(x) = \begin{bmatrix} v_x(x) \\ v_x(x) \\ 0 \end{bmatrix} =$$

$$\begin{bmatrix} \frac{dx}{dt} \\ \frac{dy}{dt} \\ 0 \end{bmatrix} = \begin{bmatrix} \frac{d(X/Z)}{dt} \\ \frac{d(Y/Z)}{dt} \\ 0 \end{bmatrix} = \frac{1}{Z^2}\begin{bmatrix} ZV_x - XV_z \\ ZV_y - YV_z \\ 0 \end{bmatrix} = \frac{1}{Z(x)}(x \times V) \times \hat{Z},$$

where v(x) is an optical flow of a x coordinate point for a 3D plane including X, Y, Z coordinates, and V is an instantaneous motion for a given coordinate of a 3D point. The computer program code for determining the epipolar line may further include computer program code for calculating $$0 = l_x \cdot x^t = x \begin{bmatrix} 0 & -T_z & T_y \\ T_z & 0 & -T_x \\ -T_y & T_x & 0 \end{bmatrix} x^t,$$

where $l_x = -t(x \times T) + t^2(w^t QT)\hat{Z}$, $$Q = [x]^2 = \begin{bmatrix} -(1+y^2) & xy & x \\ xy & -(1+x^2) & y \\ x & y & -(x^2+y^2) \end{bmatrix},$$

t is a given time, w is the angular velocity, and T is a translation of a given coordinate.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
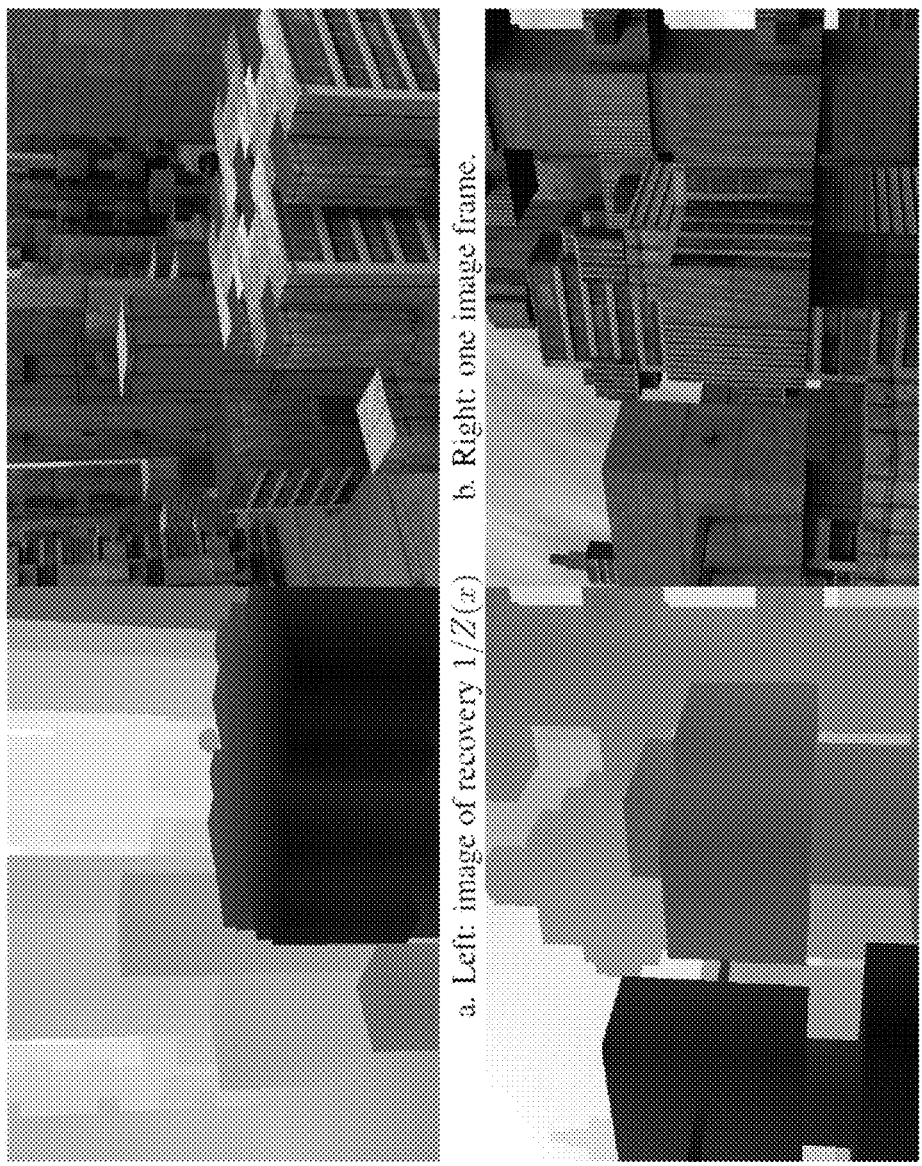
FIG. 1 illustrates exemplary image processing results according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The present disclosure addresses the problem of extracting 3D structure (shape) and object or camera motion simultaneously from image sequences. Recovering shape and motion has wide applicability in many areas such as robot vision, self-driving vehicles, image coding, and 3-dimensional modeling, etc. Motion of 3D surface patches may be examined. For example, an image of a set of N number 3D points $P_i^t = (X_i(t), Y_i(t), Z_i(t))$; i=1, ... N over two frames, from frame f=0 to frame f=1. At each frame f, associated to a time $t_f$, each $P_i^{t_f}$ can be projected to an image frame coordinate $x_i^{t_f}$ via $$x_i^t = \frac{1}{Z_i(t)} P_i^t \tag{1}$$

where the index f is dropped from $t_f$ for simplicity. In order to transform to pixels, one can apply a linear transformation, e.g., $$p_i = L_F x_i^t, \text{ where } L_F = \begin{bmatrix} -f_x & \alpha f_y & o_x \\ 0 & -f_y & o_y \\ 0 & 0 & 1 \end{bmatrix} \tag{2}$$

with $$f_x = \frac{F}{s_x} \text{ and } f_y = \frac{F}{s_y},$$

where F is the focal length of the camera (e.g., in millimeter units), $(s_x, s_y)$ is the spacing between pixels (e.g., in millimeter units), and $o=(o_x, o_y)$ is the image center of projection in pixels. A $P^t$ is moving at time t=0 with 3D velocity V, which can vary from point to point. From time $t_0=0$ to $t_1=t$, and as long as t→0, this point moves to $p^t = p^0 + V(P^0)t$.

Optical flow is an essential parameter in image processing that can be used in image processing methods for detecting salient motion in an image sequence. An optical flow v can be calculated to measure the displacement $$v = \lim_{t \to 0} \frac{x^t - x^0}{t},$$

where $x^0$ and $x^t$ are the projections of the 3D points $P^0$, $P^t$. In other words, v may be thought of as the projection of the 3D velocity $$V^t(P) = \frac{dP^t}{dt} = \left( \frac{dX(t)}{dt}, \frac{dY(t)}{dt}, \frac{dZ(t)}{dt} \right) = (V_x^t, V_y^t, V_z^t),$$

to the image frame. Thus, $$v(x) = \begin{bmatrix} v_x(x) \\ v_x(x) \\ 0 \end{bmatrix} = \tag{3}$$

$$\begin{bmatrix} \frac{dx}{dt} \\ \frac{dy}{dt} \\ 0 \end{bmatrix} = \begin{bmatrix} \frac{d(X/Z)}{dt} \\ \frac{d(Y/Z)}{dt} \\ 0 \end{bmatrix} = \frac{1}{Z^2} \begin{bmatrix} ZV_x - XV_z \\ ZV_y - YV_z \\ 0 \end{bmatrix} = \frac{1}{Z(x)}(x \times V) \times \hat{Z}.$$

Rigid Instantaneous Motion (RIM) of a Patch

One can represent the instantaneous motion $V=(V_x, V_y, V_z)$ of a rigid patch, by a rotation and translation. The rotation is by a unique angular velocity w and the translation T is unique given the origin of the coordinate system (e.g., given the axis of rotation). More precisely, the motion of $V=(V_x, V_y, V_z)$ under the RIM assumption is given by $$V(P) = w \times P + T \tag{4}$$

Using optical flow with RIM, inserting (4) into (3) provides $$v = \begin{bmatrix} v_x(x) \\ v_x(x) \\ 0 \end{bmatrix} = \left[ -(x \times (x \times w)) + \frac{1}{Z(x)} x \times T \right] \times \hat{Z}. \tag{5}$$

It is noticeable that given the motion vectors w, T, which are assumed to be constant over a patch, the 2D optical flow is now parametrized by one parameter Z(x), and the Z(x) parameter gives the depth of a point.

Solving for w, T, Z(x):

In one embodiment, Z(x) is eliminated from (5) so that an equation on w, T valid for all points in a patch moving with RIM can be obtained. Once w, T are solved, Z(x) can be recovered by inserting w, T back into (5) and solving for Z(x).

Z(x) elimination:

Equation (5) may be rewritten as $$v + (x \times (x \times w)) \times \hat{Z} = \frac{1}{Z(x)}(x \times T) \times \hat{Z} \tag{6}$$

$$\Downarrow$$

$$[v + (x \times (x \times w)) \times \hat{Z}] \times [(x \times T) \times \hat{Z}] = 0$$

where Z(x) is eliminated by taking the cross product of parallel vectors (one scaled by Z(x)). Z(x) can be recovered if the following assumption holds $$(x \times T) \times \hat{Z} \neq \Leftrightarrow \begin{cases} yT_z - T_y \neq 0 \\ \text{or} \\ xT_z - T_x \neq 0 \end{cases}.$$

Then, from (6) the following is obtained:

$$\frac{1}{Z(x)} = \frac{v + (x \times (x \times w)) \times \hat{Z}}{(x \times T) \times \hat{Z}}. \quad (7)$$

After some manipulations with (6), and using the skew symmetric representation for x, $$[x] = \begin{bmatrix} 0 & -1 & y \\ 1 & 0 & -x \\ -y & x & 0 \end{bmatrix}, \quad (8)$$

the following is obtained:

$$0 = (x \times v) \cdot T + (x \times w) \cdot (x \times T) \quad (9)$$
$$= v^T(x)[x]T + w^T[x]^2 T$$
$$= q^T(x) \cdot T + w^T Q(x) T$$

where, $$q = x \times v = [x]v \text{ and} \quad (10)$$

$$Q = [x]^2 = \begin{bmatrix} -(1+y^2) & xy & x \\ xy & -(1+x^2) & y \\ x & y & -(x^2+y^2) \end{bmatrix}.$$

Obtaining Z(x) from w, T, v(x) can be obtained by inserting their values in (5). Equation (9) is quadratic in w, T and thus, quadratic methods can be considered.

FIG. 1 illustrates exemplary recovery of depth from two images 'b' and 'd'. Left images 'a' and 'c' may be extracted from right images 'b' and 'd', respectively, by obtaining Z(x). Using Z(x), distances of object surfaces from an observed point of view (or relative distances of objects from a perspective of first person view) from a camera(s) can be translated into a grayscale value, as illustrated in images 'a' and 'c'.

A Recursive Method for Solving for w and T:

According to certain embodiments, a fast iterative method can be used where w and then T are found in a recursive manner. A first case T=0 (or |T|<ϵ where ϵ is some tolerable error for the estimation of T) is considered. In this case, (5) becomes $$v(x) = [-(x \times (x \times w))] \times \hat{Z} = A(x)w \text{ where} \quad (11)$$
$$A(x) = \begin{bmatrix} -xy & (1+x)^2 & -y \\ -(1+y^2) & xy & x \end{bmatrix}$$

at all points $x_i$; i=1, ..., N in a patch, e.g., solve the linear system $$\begin{bmatrix} v(x_1) \\ v(x_2) \\ \vdots \\ v(x_N) \end{bmatrix} = \begin{bmatrix} A(x_1) \\ A(x_2) \\ \vdots \\ A(x_N) \end{bmatrix} \begin{bmatrix} w_x \\ w_y \\ w_z \end{bmatrix}. \quad (12)$$

One embodiment includes taking the pseudo inverse of "A", where A is a 2 N×3 matrix, and apply to v, a 2 N×1 vector. Once w* is solved, one can evaluate the error $$\epsilon_{T=0} = \Sigma_{i=1}^N [v(x_i) - A(x_i)w^*]^2 \quad (13)$$

If $\epsilon_{T=0} \leq$ Threshold, where Threshold is a constant to be estimated, then one can consider the hypothesis of T≈0 successful. Else, if $\epsilon_{T=0} >$ Threshold, proceed to evaluate w, T. Since there is an intrinsic positive scale for T that cannot be recovered, a direction for T is randomly selected, e.g., choose T such that |T|=1 and the direction is random. One can then solve for w in (9), e.g., solving $$\begin{bmatrix} q^T(x_1)T \\ q^T(x_2)T \\ \vdots \\ q^T(x_N)T \end{bmatrix} = - \begin{bmatrix} Q(x_1)T \\ Q(x_2)T \\ \vdots \\ Q(x_N)T \end{bmatrix} \begin{bmatrix} w_x \\ w_y \\ w_z \end{bmatrix} \quad (14)$$

via the pseudo-inverse method, and obtain $w^{iter=0}$. Then, one can iterate and solve for T by solving (9), e.g., solving $$0 = [q^T(x) + w^T Q(x)]T$$

using the data at all N points e.g., $$0 = \begin{bmatrix} q^T(x_1) + w^T Q(x_1) \\ q^T(x_2) + w^T Q(x_2) \\ \vdots \\ q^T(x_N) + w^T Q(x_N) \end{bmatrix} \begin{bmatrix} T_x \\ T_y \\ T_z \end{bmatrix} \quad (15)$$

and once $T^{iter=1}$ is solved, one can solve again for $w^{iter=2}$ in the same way used to solve for $w^{iter=0}$. Similarly, $T^{iter=3}$ can be solved in the same way used to solve for $T^{iter=1}$. This iterative process can stop once the error $$\epsilon_{w,T} = \Sigma_{i=1}^N [q^T(x)T^* + (w^*)^T Q(x)T^*]^2 \quad (16)$$

is no longer reduced. This error also gives a measure of how good is the recovery of w*, T*. If the errors is below some threshold wT-Threshold, then the solution is accepted and the recovery of Z(x) is obtained. If the error is above the threshold, then this patch is considered not to have a solution w, T.

Epipolar Line

A resemblance to the structure from two cameras (stereo vision) can be exploited. Each camera captures a 2D image of the 3D world. When two cameras view a 3D scene from two distinct points of view, there are a number of geometric relations between the 3D points and their projections onto the 2D images that lead to constraints between the image points. The epipolar geometry describes the relation between the two resulting views. The concept of epipolar line is invoked at time t. Unlike stereo vision, "the camera calibration step" to recover the essential matrix described by w, T cannot be done a priori using predefined patterns. One must recover from the data at the time of estimation. Moreover, w, T will vary from patch to patch (unlike stereo).

In one embodiment, an epipolar line equation associated with the motion of a patch can derived by replacing $$v = \frac{x^t - x}{t}$$

in (9) to obtain $$0 = l_x \cdot x^t \quad (17)$$

where $l_x = -t(x \times T) + t^2(w'QT)\hat{Z}$.

Given w, T and x, this is a linear equation on $x^t$, e.g., this equation defines a line in frame f=1, where $x^t$ lies. In this way the problem of searching for a correspondence to x at time t is a one dimensional search (and the line is parametrized by Z(x)). This equation may be applied on the limit t→0 and so, the quadratic terms are discarded on t, $l_x = -t(x \times T)$ or the epipolar line equation becomes $$0 = l_x \cdot x^t = x \begin{bmatrix} 0 & -T_z & T_y \\ T_z & 0 & -T_x \\ -T_y & T_x & 0 \end{bmatrix} x^t$$

This is a symmetric equation that gives epipolar lines on both frames, f=0, 1.

Figure 2:
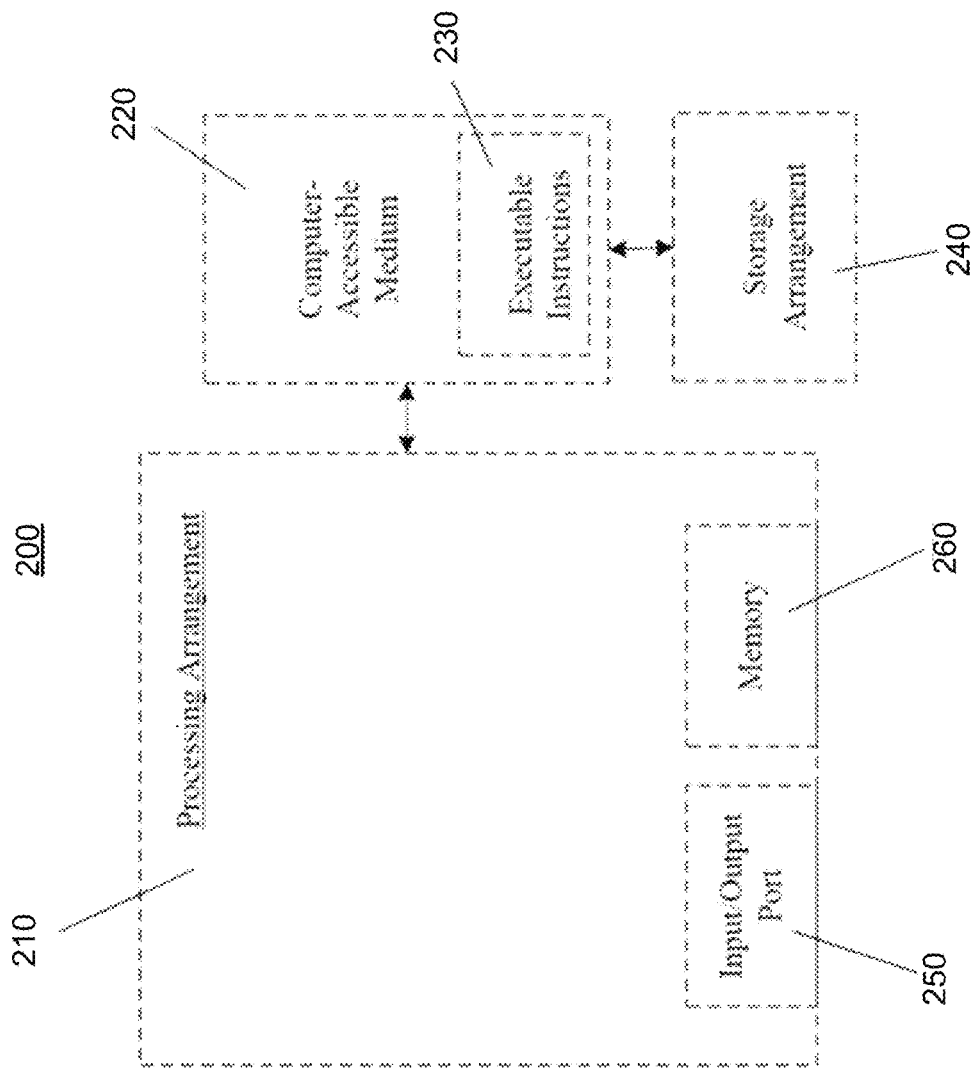
FIG. 2 illustrates a computing system according to an embodiment of the present invention.

As shown in FIG. 2, e.g., a computer-accessible medium 220 (e.g., as described herein, a storage device such as a hard disk, floppy disk, memory stick, CD-ROM, RAM, ROM, etc., or a collection thereof) can be provided (e.g., in communication with the processing arrangement 210. The computer-accessible medium 220 may be a non-transitory computer-accessible medium. The computer-accessible medium 220 can contain executable instructions 230 thereon. In addition, or alternatively, a storage arrangement 240 can be provided separately from the computer-accessible medium 220, which can provide the instructions to the processing arrangement 210 so as to configure the processing arrangement to execute certain exemplary procedures, processes and methods, as described herein, for example. Alternatively, the instructions may be loaded into memory 260 and executed via processing arrangement 210. System 200 may also include a display or output device, an input device such as a key-board, mouse, touch screen or other input device, and may be connected to additional systems via input/output port 250 or a logical network (not illustrated). According to one embodiment, cameras may be configured as input devices to provide images for processing arrangement 210 to determine RIM and epipolar lines.

Many of the embodiments described herein may be practiced in a networked environment using logical connections to one or more remote computers having processors. In another embodiment, images may be transmitted to processing arrangement 210 using a logical connection/network. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIGS. 1 through 2 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for extracting motion and structure from a sequence of images stored on a computer system, the method comprising:
   obtaining images including a set of three-dimensional (3D) points over a plurality of frames;
   determining an instantaneous motion of the set of 3D points by an angular velocity and a translation with respect to an axis of rotation;
   computing an optical flow using the instantaneous motion of the set of 3D points based on a projection of velocity of the set of 3D points;
   computing a depth of the set of 3D points from the optical flow; and
   determining an epipolar line in the images using the optical flow.

2. The method of claim 1 wherein obtaining the images includes retrieving the images from a memory device of the computer system.

3. The method of claim 1 further comprising analyzing, by a processor of the computer system, distances of object surfaces within the images based on the depth and the epipolar line in the images.

4. The method of claim 1 wherein determining the instantaneous motion of the set of 3D points includes calculating $V(P)=w \times P+T$, where $V(P)$ is the instantaneous motion of a given point, w is the angular velocity, P is the given point, and T is a translation of the given point.

5. The method of claim 1 wherein computing the optical flow comprises computing displacement of 3D velocity for the set of 3D points over the plurality of frames.

6. The method of claim 1 wherein computing the optical flow comprises calculating $$v(x) = \begin{bmatrix} v_x(x) \\ v_x(x) \\ 0 \end{bmatrix} = \begin{bmatrix} \frac{dx}{dt} \\ \frac{dy}{dt} \\ 0 \end{bmatrix} = \begin{bmatrix} \frac{d(X/Z)}{dt} \\ \frac{d(Y/Z)}{dt} \\ 0 \end{bmatrix} = \frac{1}{Z^2} \begin{bmatrix} ZV_x - XV_z \\ ZV_y - YV_z \\ 0 \end{bmatrix} = \frac{1}{Z(x)}(x \times V) \times \hat{Z},$$

where $v(x)$ is an optical flow of a x coordinate point for a 3D plane including X, Y, Z coordinates, and V is an instantaneous motion for a given coordinate of a 3D point.

7. The method of claim 1 wherein determining the epipolar line includes calculating $$0 = l_x \cdot x^t = x \begin{bmatrix} 0 & -T_z & T_y \\ T_z & 0 & -T_x \\ -T_y & T_x & 0 \end{bmatrix} x^t,$$

where $l_x = -t(x \times T) + t^2(w^t Q T)\hat{Z}$, $$Q = [x]^2 = \begin{bmatrix} -(1+y^2) & xy & x \\ xy & -(1+x^2) & y \\ x & y & -(x^2+y^2) \end{bmatrix},$$

t is a given time, w is the angular velocity, and T is a translation of a given coordinate.

8. The method of claim 1 wherein the computer system is selected from a group consisting of robotic vision, self-driving vehicles, image coding, and 3D modeling.

9. A system for extracting motion and structure from a sequence of images stored on a memory device, the system comprising:
   a processor; and
   a memory having executable instructions stored thereon that when executed by the processor cause the processor to:
      obtain images including a set of three-dimensional (3D) points over a plurality of frames;
      determine an instantaneous motion of the set of 3D points by an angular velocity and a translation with respect to an axis of rotation;
      compute an optical flow using the instantaneous motion of the set of 3D points based on a projection of velocity of the set of 3D points;
      compute a depth of the set of 3D points from the optical flow; and
      determine an epipolar line in the images using the optical flow.

10. The system of claim 9 further comprising the processor analyzing distances of object surfaces within the images based on the depth and the epipolar line in the images.

11. The system of claim 9 wherein the processor determines the instantaneous motion of the set of 3D points includes the processor calculating $V(P)=w \times P+T$, where $V(P)$ is the instantaneous motion of a given point, w is the angular velocity, P is the given point, and T is a translation of the given point.

12. The system of claim 9 wherein the processor computes the optical flow comprises the processor computing displacement of 3D velocity for the set of 3D points over the plurality of frames.

13. The system of claim 9 wherein the processor computes the optical flow comprises the processor calculating $$v(x) = \begin{bmatrix} v_x(x) \\ v_x(x) \\ 0 \end{bmatrix} = \begin{bmatrix} \frac{dx}{dt} \\ \frac{dy}{dt} \\ 0 \end{bmatrix} = \begin{bmatrix} \frac{d(X/Z)}{dt} \\ \frac{d(Y/Z)}{dt} \\ 0 \end{bmatrix} = \frac{1}{Z^2} \begin{bmatrix} ZV_x - XV_z \\ ZV_y - YV_z \\ 0 \end{bmatrix} = \frac{1}{Z(x)}(x \times V) \times \hat{Z},$$

where $v(x)$ is an optical flow of a x coordinate point for a 3D plane including X, Y, Z coordinates, and V is an instantaneous motion for a given coordinate of a 3D point.

14. The system of claim 9 wherein the processor determines the epipolar line includes the processor calculating $$0 = l_x \cdot x^t = x \begin{bmatrix} 0 & -T_z & T_y \\ T_z & 0 & -T_x \\ -T_y & T_x & 0 \end{bmatrix} x^t,$$

where $l_x = -t(x \times T) + t^2(w^t QT)\hat{Z}$, $$Q = [x]^2 = \begin{bmatrix} -(1+y^2) & xy & x \\ xy & -(1+x^2) & y \\ x & y & -(x^2+y^2) \end{bmatrix},$$

t is a given time, w is the angular velocity, and T is a translation of a given coordinate.

15. The system of claim 9 wherein the depth of the set of 3D points and the epipolar line in the images are utilized in a system selected from a group consisting of robotic vision, self-driving vehicles, image coding, and 3D modeling.

16. Non-transitory computer readable medium comprising program code that when executed by a programmable processor causes execution of a method for extracting motion and structure from a sequence of images stored on a computer system, the computer readable medium comprising:
   computer program code for obtaining images including a set of three-dimensional (3D) points over a plurality of frames;
   computer program code for determining an instantaneous motion of the set of 3D points by an angular velocity and a translation with respect to an axis of rotation;
   computer program code for computing an optical flow using the instantaneous motion of the set of 3D points based on a projection of velocity of the set of 3D points;
   computer program code for computing a depth of the set of 3D points from the optical flow; and
   computer program code for determining an epipolar line in the images using the optical flow.

17. The computer readable medium of claim 16 wherein the computer program code for obtaining the images includes computer program code for retrieving the images from a memory device of the computer system.

18. The computer readable medium of claim 16 further comprising computer program code for analyzing, by a processor of the computer system, distances of object surfaces within the images based on the depth and the epipolar line in the images.

19. The computer readable medium of claim 16 wherein the computer system is selected from a group consisting of robotic vision, self-driving vehicles, image coding, and 3D modeling.

20. The computer readable medium of claim 16 wherein the computer program code for computing the optical flow further includes computer program code for computing displacement of 3D velocity for the set of 3D points over the plurality of frames.

* * * * *